I. S. DOTEN.
SPECTACLES.

No. 190,133.   Patented May 1, 1877.

Witnesses:
O. W. Bond
H. F. Brown

Inventor:
Ira S. Doten,
By West & Bond Attys.

UNITED STATES PATENT OFFICE.

IRA S. DOTEN, OF BRISTOL STATION, ILLINOIS.

IMPROVEMENT IN SPECTACLES.

Specification forming part of Letters Patent No. 190,133, dated May 1, 1877; application filed October 2, 1876.

*To all whom it may concern:*

Be it known that I, IRA S. DOTEN, of Bristol Station, Kendall county, State of Illinois, have invented a new and useful Improvement in Spectacles, of which the following is a full description, reference being had to the accompanying drawings, in which—

Figure 1:
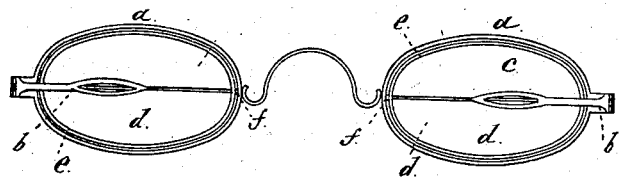
Figure 2:
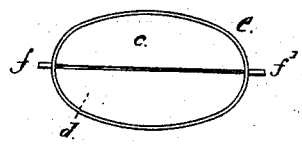

Figure 1 is an elevation, showing the spectacles completed; Fig. 2, a detail, showing one of the glasses removed.

Persons using spectacles often require lenses of different powers to walk and see distant objects with, and to read with, which necessitates the carrying of two pair of spectacles, as those with lenses which have the proper focus to read with cannot be used to walk with, as they blur and obscure objects when so used; while those with the proper lenses for walking with cannot be used for reading, as the focus is not strong enough.

To avoid carrying two pair, spectacles having stationary glasses have been constructed, with segments of different foci in each glass, one section or segment having the proper focus for reading, and the other for walking and looking at objects at a distance.

Although this construction does away with carrying two pair of spectacles, wearers object to their use because of the discomfort and annoyance arising from changing the position where worn in order to adjust the required focus in proper relative position to the eye and object.

The object of my invention is to avoid this change of position where worn, and this I accomplish by the use of glasses, each having two sections of different foci, placed in separate frames from the frames of the spectacles proper, and hanging such frames on pivots, so that the glasses can be turned to bring the required focus into proper position for use.

In the drawings, $a$ represents the main frame; $b$, the bows; $c$, the section of the glass or lens having the reaching focus; $d$, the section of the glass or lens having the walking focus; $e$, the secondary frame, in which the glasses $c\ d$ are secured in the usual manner; $f\ f'$, the trunnions or pivots of the frame $e$.

The frame $a$ is provided with the usual openings for the reception of the lenses, and with ears for attaching the bows, and is to be made of gold, silver, steel, or other suitable material. The bows $b$ are to be made of the same material as the frame, and are to be secured thereto in the usual manner.

The glasses consist of two sections, $c\ d$, each having a different focus, and are made in the usual way of constructing such glasses. These glasses are secured in the secondary frames $e$, which frames are provided with trunnions $f f'$, by means of which the frames $e$ are pivoted or hung in the openings of the main frame $a$, so as to be free to revolve therein. The trunnions $f f'$ enter corresponding holes or recesses in the frame $a$.

To secure the frames $e$ in place in the openings, the frame $a$ is sprung apart at its ears; then the trunnion $f$ is inserted; then the trunnion $f'$ is forced into its recess in the ear, and then the ears are brought together and secured in any suitable manner.

As shown in the drawings, Fig. 1, the spectacles are arranged for reading, the section $d$, having the strongest focus, being down. In this position the upper segment $c$ can be used, if it is desired to look at anything above the wearer, at a distance off, without changing the positions of the foci; but when it is desired to use the spectacles for walking, the segment $c$ must have the lowest position, as the eye naturally looks down in walking; and to attain this end all that is necessary to be done is to revolve the frame $e$, bringing the section $c$ to the lowest position, when the focus will be the one required for walking.

By this arrangement all the advantages derived from two pair of spectacles having different foci will be obtained, and the disadvantages arising from the use of spectacles having glasses with sections of different foci held stationary in the frame will be overcome, as by revolving the glasses the proper focus can be brought into position with no change in the place where worn.

What I claim as new, and desire to secure by Letters Patent, is—

In combination with a spectacle-frame, a revolving secondary frame, $e$, carrying glasses provided with sections having different foci, substantially as and for the purposes specified.

IRA S. DOTEN.

Witnesses:
THOMAS HARTMAN,
FRANK W. DOTEN.